Jan. 15, 1963  K. N. CEDERQUIST  3,073,672
METHOD OF GASIFYING SULPHUROUS CELLULOSE WASTE LIQUORS
Filed April 4, 1960
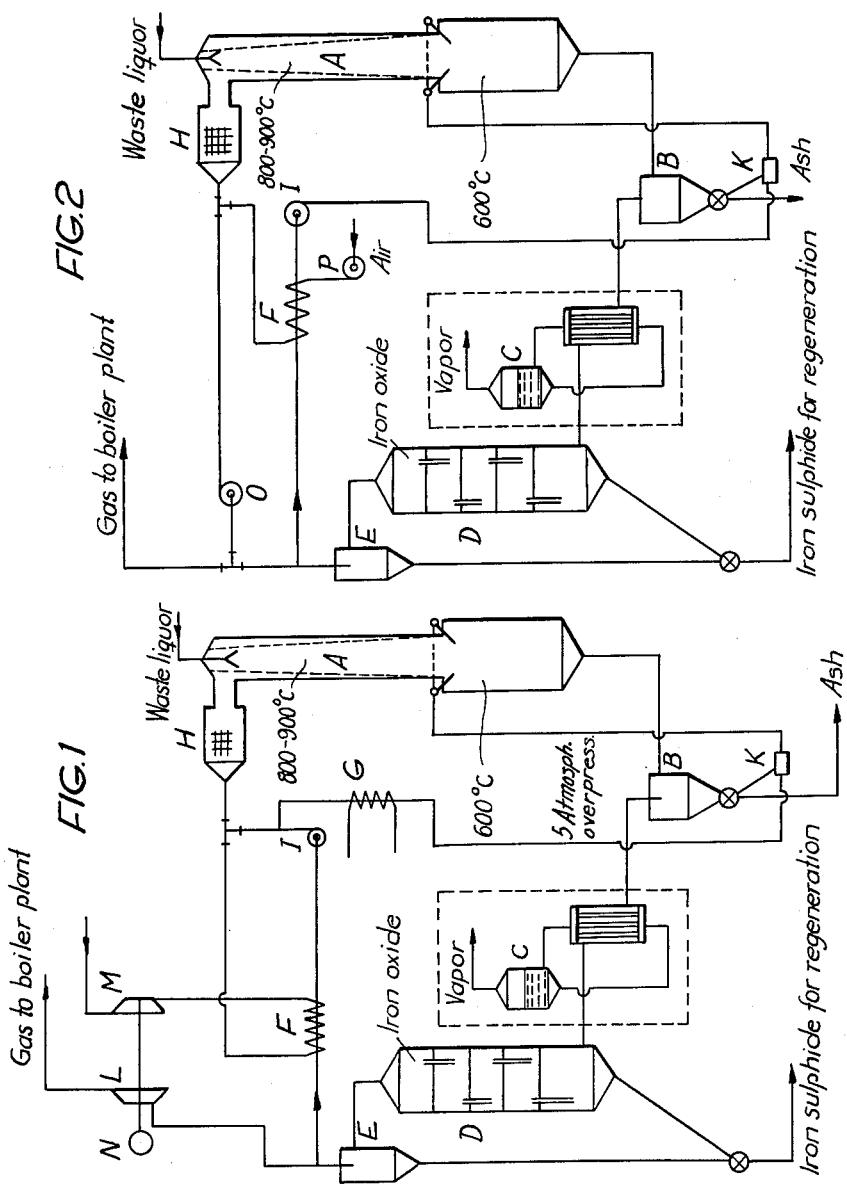
Karl Nicolaus Cederquist
INVENTOR.
BY
Cushman, Darby & Cushman
Attorneys United States Patent Office 3,073,672
Patented Jan. 15, 1963

3,073,672
METHOD OF GASIFYING SULPHUROUS CELLULOSE WASTE LIQUORS
Karl N. Cederquist, Falun, Sweden, assignor to Stora Kopparbergs Bergslags Aktiebolag, Falun, Sweden, a corporation of Sweden
Filed Apr. 4, 1960, Ser. No. 19,947
Claims priority, application Sweden Apr. 15, 1959
13 Claims. (Cl. 23—48)

This invention relates to a method of utilizing waste liquors from the cellulose production, recovering the inorganic chemicals and converting the organic content to gaseous products usable for synthesizing useful organic chemicals or as a fuel for heat and power production. These gaseous products are produced by partially oxidizing the waste liquors from cellulose production at high temperature in a continuous manner and freeing them from inorganics as described in the following specification.

The composition of the gaseous products varies according to the gasifying temperature, the composition of the organic substance of the products and the amount of water present, but it is substantially independent of the nature of the inorganic base of the waste liquor, whether it is calcium, or sodium, for example. The origin of the liquors is of no concern, but they must include a minimum quantity of organic substance. It is unimportant whether the liquors to be gasified are produced by digesting sulphite, sulphate or neutral sulphite.

Decreasing temperature and concentration of the liquor produces a gas richer in hydrogen. At a temperature of about 1100° C. the $CO/H_2$ relation for a 50% (i.e. containing 50% organic substance) sulphite waste liquor is about 1:1.5 provided that the gasification is carried out without the addition of molecular oxygen, i.e. that the gasification is a true water gas reaction.

Owing to its strongly endothermic nature, however, the water gas reaction is difficult to achieve in practice. In several respects, the gasification is simplified, if it is made self-sufficient as to heat by carrying out the gasification in the presence of oxygen. The reaction temperature will be maintained by a continuous partial combustion of the organic substance. Hereby the amount of carbon monoxide and hydrogen formed is decreased, but, instead, heat is produced which mainly is released as physical heat in the gas-vapor-mixture and can be utilized in a known manner for heating purposes, for example for steam generation.

The gasification of waste liquors by means of oxidation with molecular oxygen requires a minimum content of organic matter in the liquor of 30–35%. From technical point of view, however, it is preferable to use evaporated liquor of the highest possible concentration generally 50–60%. In certain cases dry liquor produced by spray drying may be particularly advantageous. Increasing the water content of the liquor renders it more difficult to fully utilize the exothermic heat for qualified heating purposes.

In the reducing atmosphere prevailing in the gasification process, the sulphur occurs partially in the gas phase as hydrogen sulphide and partially in the ash phase substantially as sulphide. The distribution of sulphur between said phases is primarily determined by the temperature. When the gasification is carried out with thick liquor, for example at a temperature of 600° C. and lower, the sulphur occurs substantially in the gas phase, whether the base consists of calcium or sodium. With increasing temperature, the equilibrium changes in such a manner that a greater amount of sulphur is fixed to the base and changes in reverse direction again when the temperature becomes very high. The admixture of molecular oxygen and a lower concentration of the liquor affects the sulphur equilibrium by somewhat raising the upper limit of the temperature range in which substantially all the sulphur is present in the gas phase.

By combustion or partial combustion of thick liquor (40–60%) at a temperature of about 600° C. or lower, it is possible to separate the sulphur from the base and to recover the two products in different phases in the form of hydrogen sulphide and carbonate respectively.

A temperature of 600° C. or lower, however, is too low for a satisfactory gasification of the organic substance. A low reaction velocity renders the gasification more difficult, and carbon may easily remain in the ash. In practice, a complete gasification requires a temperature of between 700 and 1000° C. In other words, the gasification must be carried out at a temperature at which a substantial portion of sulphur is fixed in the ash. This complicates the recovery of sulphur to a high degree because the sulphur must be recovered both from the ash phase and from the gas phase.

It has been found possible, however, to cause the sulphur to go over into the gas phase in a simple and rapid manner, even if the gasification temperature is between 700 and 1000° C., by carrying out the gasification in two steps. The first step comprises the substantial gasification of the solid fuel at a temperature above 700° C., immediately thereafter followed by the second step in which the reaction mixture is cooled with cold gas free or almost free of molecular oxygen to a temperature of 600° C. or lower, at which temperature the solid phase is maintained in contact with the gas until the sulphur equilibrium, in which all sulphur is present in the gas phase, is obtained and the gasification reaction is carried out completely.

The gasification of liquor by means of a true water gas reaction at a temperature not exceeding 600° C. may be carried out in various ways. W. H. Gauvin, TAPPI, vol. 40, Nov. 11, 1957, for example, has proposed to apply the so-called AST-method comprising the steps of spraying finely dispersed liquor into a vertical retort and to gasify the liquor by means of heating the retort from the outside. According to another method, the gasification reaction is carried out in such a manner that the liquor is sprayed directly into overheated gases free of oxygen. Both these methods, however, have drawbacks when they are applied to the gasification of waste liquors. For carrying out the indirect process according to Gauvin, considerable heat surfaces are required. In view of the temperature conditions prevailing during the gasification process, the heat-resisting construction material has such a low strength that it is difficult to design the generator in a technically satisfactory manner. As a further problem is to be mentioned the difficulty in obtaining an acceptable heat economy for the process. According to the second of the above mentioned methods, large quantities of gas must be used at a high temperature, as owing to the great amount of water to be vaporized and superheated. The gasification process demands much heat, which requires the circulation of large steam and gas volumes and, consequently, a plant of great dimensions.

In order to eliminate said drawbacks, the gasification process must be carried out under exothermic conditions by means of adding molecular oxygen to the gasification zone and preferably under pressure, rendering it possible to reduce the dimensions of the plant and at the same time to produce power.

Owing to the fact that the liquor when dried and subjected to destructive distillation in hot gases, gives a solid bulky residue which easily keeps suspended in the gas, the gasification reaction must be executed cocurrently, as otherwise difficulties will arise in cleaning the gas due to entrained incompletely burnt particles.

By gasification cocurrently a generator gas is produced which is free of tar and unburnt particles, the ash consisting exclusively of the inorganic matter in the liquor.

In order to react the liquor with the oxygen, all water must be vaporized and the steam with finely dispersed solid substance heated to such a high temperature that the reaction with the oxygen starts and raises the temperature to gasification temperature. Said vaporizing is either effected by dispersing the liquor in hot gas free of oxygen gas and thereafter adding an adjusted amount of molecular oxygen, or by dispersing the liquor in hot gases containing an adjusted amount of molecular oxygen. The hot gas is preferably produced by means of combustion of the generator gas formed by the gasification. The additional oxygen needed for carrying out the gasification can either be supplied as surplus oxygen at the combustion of the generator gas or be supplied at the dispersion of the liquor in the hot gas.

The cooling of the reaction mixture in the cooling zone is preferably carried out by means of circulating generator gas free of sulphur, the temperature of said gas being determined by the amount of circulation gas used. The recirculation of said sulphur-free generator gas contributes also to the increase in the absolute amount of sulphur going over to the gas phase, owing to the increased total amount of sulphur-free gas.

The outgoing hot generator gas from the cooling zone can be freed of ash (sodium or calcium carbonate) by means of cyclone separation or other mechanical or electrostatic cleaning methods. The effective gas cooling renders it possible to control the difficulties which possibly may arise owing to the varying sticking tendency of the ash during the discharge and the gas cleaning.

It is a matter of fact that the reaction time for reaching the sulphur equilibrium in the cooling process depends on the chemical and physical properties of the ash. In certain cases the reaction time may be too short during the passage through the cooling zone for obtaining a complete reaction between the gas and the solid phase. According to the gasification method described here, however, the reaction time between the solid phase and the gas phase can be increased easily by recirculation of the ash to the cooling zone. It makes no difficulties whatever to obtain a multifold reaction time so that the sulphur equilibrium represents almost all sulphur in the gas phase. In order to obtain the sulphur equilibrium within a short time, the reaction mixture may be put into vibration by means of ultrasonics or another suitable method.

After the solid matter is removed from the generator gas, which can be accomplished without any appreciable loss of heat, the gas is preferably freed of sulphur. This can be carried out by scrubbing the gases with a suitable scrubbing agent, by reacting the hydrogen sulphide in the gas phase with $SO_2$ according to a modified Clauss-process, or most preferably by treating the generator gas with reactive iron oxide at a temperature of between 300 and 600° C. at which temperature both hydrogen sulphide and organic sulphur is bound as iron sulphide. Iron oxide is regenerated from iron sulphide by oxidation with air at a temperature of between 600 and 700° C. whereby sulphur substantially is recovered as $SO_2$.

If the sulphur removing is carried out via iron oxide, the physical heat losses of the generator gas can be kept low, and for the production of hot gas for the vaporization and gasification of the liquor generator gas of high temperature can be burned. The generator gas freed of sulphur which is used for cooling has of course to be cooled in one way or another. The generator gas formed which escapes from the producer may be used for example in a boiler plant, without cooling so that the physical heat of the gas may be utilized in this manner.

By direct sulphur removing with iron oxide without cooling of the gas, a good thermal efficiency of the plant is obtained, owing to the fact that the physical heat of the generator gas can be utilized entirely for the production of heat and steam.

The gasification process according to the method described may also easily be carried out at pressure for making use of the hot gases for production of power. In this case, the producer operates like a combustion chamber in a gas turbine plant. As a matter of course, the escaping producer gas from the cooling zone must be cleaned of ash and sulphur before it is allowed to pass through the gas turbine. Said cleaning procedure should be carried out at a high temperature, 300–600° C., depending in the magnitude of the power being produced in the gas turbine. No additional superheating is needed. Owing to the water content of the liquor, the steam volume is considerable and contributes to increased power production.

The pressure conditions for the gasification process also may be chosen in such a manner that the heat content (condensation heat) of the water vapour in the gas can be utilized by cooling the gas under pressure, which may be of importance when the liquor to be gasified is of low concentration. When gasifying a liquor of 50–60% concentration, however, the quantity of water in the gas is so small that for practical reasons it is most advantageous to utilize the physical heat of the vapour by expansion in a gas turbine. If in such a case the water in the gas should be condensed, a relatively high pressure would be necessary which renders the construction more complicated and expensive.

A flowsheet of the process for carrying out the gasification under pressure appears from FIG. 1. A portion of the generator gas produced is burned under pressure in the combustion chamber H with an excess of air which is adequate for carrying out the total gasification of organic material. The hot combustion gases having a temperature of about 1000° C. are led from the combustion chamber to the generator A while at the same time sodium sulphite waste liquor of 50–60% concentration is injected into the top of the generator. Owing to the physical heat of the combustion gases the water is rapidly vaporized, the vapour with dispersed dry substance reaching a temperature at which the molecular oxygen reacts and gasifies the organic material. The gas mixture formed with dispersed ash of substantially inorganic material flows downwards through the generator and is discharged through an outlet in the bottom. The solid material is separated from the gas in the cyclone B. During its passage through the generator the reaction mixture is cooled after the gasification zone by means of circulating gas supplied to the generator via the fan I, the cooler G and the ash injector K. In this manner an adequate amount of ash is re-circulated from the cyclone B back to the cooling zone of the generator, rendering it possible to obtain a satisfactory contact time between the solids and the gas thus facilitating the removing of sulphur from the ash and the recovery of an ash mainly consisting of soda. In the steam generator C the generator gas is cooled to 400° C. whereafter it passes through the sulphur purification tower D to which iron oxide is supplied according to the fluid-bed principle. The iron oxide is transformed to iron sulphide which is discharged and fed to a regeneration plant where the sulphur is transformed to $SO_2$ by oxidation with air. Thereafter the regenerated iron oxide is re-circulated to the sulphur purification tower. The generator gas leaving said tower is freed of solid particles in the cyclone E, whereafter part of the purified generator gas is led to the combustion chamber H and burned and another part is re-circulated to the generator by the gas pump I after cooling in the heat exchangers F and G. Excess of formed generator gas leaving the process is allowed to expand through the gas turbine L, hot gases leaving said turbine being utilized for example as fuel. To the gas turbine are connected the compressor M supplying compressed air for the combustion, and the electric generator N. The combustion air from the compressor is preheated in F, said combustion air at the same time cooling the generator gas somewhat so that the generator gas can be conveyed by the blower I without difficulty.

FIG. 2 shows the method carried out under atmospheric pressure. In this case the gas turbine plant is excluded, but in addition the low pressure fans O and P are provided for hot generator gas and air respectively.

The molecular oxygen for carrying out the gasification may be supplied as pure oxygen gas, as air or as indifferent gas, containing molecular oxygen.

The liquors may be of any concentration from 30–35% up to 100%. When using higher concentrations, 80–100%, it may be advantageous to supply aqueous steam for cooling and facilitating the sulphur equilibrium towards a complete formation of $H_2S$.

The generator gas freed of ash and sulphur may be used for the production of hydrocarbons. Owing to its composition and high temperature, the gas may be cooled directly to a temperature suitable for hydrocarbon synthesis and led directly, over catalysts of iron, cobalt etc. at atmospheric pressure or higher. Due to its relatively high water content, it makes no difference whether the relation between CO and $H_2$ in the gas is 1:1, 2:1 or higher instead of 1:2 which constitutes the ideal synthetic gas mixture, because the water vapour under proper condition can react with CO under formation of hydrocarbons and carbonic acid. The presence of an indifferent gas, for example nitrogen, has no influence on the synthesis.

Depending on the fact whether the molecular oxygen used is pure oxygen gas or air, it is possible to produce synthesis gas or generator gas adapted for the production of synthesis gas or a gas adapted for the production of ammonia.

The method described renders it thus possible to gasify the organic substance of cellulose waste liquors under temperature conditions favouring the gasification reactions and at the same time to recover a solid residue almost free of sulphur, containing the base in the waste liquor.

What I claim is:

1. A method of continuously gasifying sulfur-containing cellulose waste liquor comprising introucing finely dispersed waste liquor cocurrently into a gas comprising molecular oxygen of such temperature and in such quantity that the total water content is vaporized rapidly and that the steam-gas mixture formed thereby, which contains finely dispersed dry substance, reaches a temperature at which the molecular oxygen starts to react, and, in a first stage, raises the temperature of the reaction mixture to such a level above 700° C. that the organic material reacts completely while forming gaseous products, rapidly cooling the reaction mixture in a second stage by introducing colder gas which is at least substantially free of molecular oxygen to a temperature below the melting point of the dispersed dry substance, and not greater than about 600° C., at which temperature all types of sulfur in the reaction mixture are substantially converted to gaseous hydrogen sulfide, and separating said dispersed dry substance from the gaseous products.

2. A method of continuously gasifying sulfur-containing cellulose waste liquor, as set forth in claim 1, including recirculating at least part of said ash by introducing it into the reaction mixture at the cooling stage.

3. A method of continuously gasifying sulfur-containing cellulose waste liquors as set forth in claim 1 in which the finely dispersed waste liquor introduced into molecular oxygen has a concentration of 30–60%.

4. A method of continuously gasifying sulfur-containing cellulose waste liquors as set forth in claim 1 in which the process is carried out at super-atmospheric pressure.

5. A method of continuously gasifying sulfur-containing cellulose waste liquors as set forth in claim 1 including removing sulfur compounds from the gaseous products of the reaction.

6. A method of continuously gasifying sulfur-containing waste liquors as set forth in claim 5 in which sulfur compounds are removed by treating the gaseous products with active iron oxide at a temperature between 300° C. and 600° C.

7. A method of continuously gasifying sulfur-containing cellulose waste liquors as set forth in claim 1 in which said gas comprising molecular oxygen is produced by combustion of gaseous products of the reaction with molecular oxygen in excess.

8. A method of continuously gasifying sulfur-containing cellulose waste liquors as set forth in claim 1 in which said colder gas is a gaseous product of the reaction which is recirculated and cooled before introduction into the reaction mixture.

9. A method of continuously gasifying sulfur-containing cellulose waste liquors as set forth in claim 1 including separating the gaseous products from sulfur and solids and expanding it through a gas turbine.

10. A method of gasifying cellulose waste liquors containing sulfur compounds of a member of the group consisting of sodium and calcium, and combustible components, which comprises dispersing said liquor in a hot gas containing molecular oxygen, partially oxidizing the organic material of the liquor of said molecular oxygen at a temperature above about 700° C., cooling the gas mixture containing dispersed substances below the melting point of the ash produced by said partial oxidation by introducing colder gas which is at least substantially free of molecular oxygen, separating the ash from the gas mixture, and recovering substantially all the sulfur contained in the waste liquor by freeing the gas from hydrogen sulfide.

11. A method of gasifying cellulose waste liquors containing sulfur compounds of a member of the group consisting of sodium and calcium, which comprises dispersing the liquor in a hot gas containing molecular oxygen in an amount insufficient to support complete combustion of combustible components contained in the liquor at a temperature above 700° C., cooling the gas mixture containing dispersed substances to a temperature below the melting point of the inorganic particles in the gas mixture and not exceeding about 600° C. by introducing colder gas which is at least substantially free of molecular oxygen, separating the inorganic particles from the gas mixture at this temperature, and recovering substantially all the sulfur contained in the waste liquor by freeing the gas from hydrogen sulfide.

12. A method of gasifying aqueous waste liquors containing sulfur compounds of sodium and calcium, and combustible components which comprises dispersing the liquor in a hot gas containing molecular oxygen in an amount insufficient to support complete combustion of said combustible components at a temperature between 700° and 1000° C., rapidly cooling the reaction mixture to a temperature below the melting point of the inorganic substances dispersed therein and not exceeding about 600° C. by introducing colder gas which is at least substantially free of molecular oxygen, and removing the dispersed substances at this temperature, and thereafter freeing the gas from hydrogen sulfide.

13. A method of recovering sulfur, and sodium and calcium bases separately and producing a combustible gas from waste liquors containing sulfur compounds of a member of the group consisting of sodium and calcium, and combustible components, comprising the steps of cocurrently finely dispersing said waste liquor in a first reaction zone, in a hot gas stream containing molecular oxygen in an amount insufficient to support complete combustion of said combustible components, maintaining in this first zone a temperature of between 700° C. and 1000° C., rapidly cooling, in a second zone, this reaction mixture containing carbon oxide and hydrogen produced by the incomplete combustion and finely dispersed inorganic material, by means of colder gas recirculated from a later stage in the process to a temperature below the melting point of the inorganic substances and not exceeding about 600° C., removing the dispersed substances thereby leaving substantially all sulfur, free and combined, in the gas, and, cooling the gas in a third step and removing the sulfur in the form of hydrogen sulfide, recirculating part of the gas obtained from the third step to said second zone for cooling, and mixing another part of the gas obtained from said third step wtih an oxygen-containing gas, and introducing this mixture in the first step as said hot gas for gasifying the liquor.

References Cited in the file of this patent

UNITED STATES PATENTS

| | | |
|---|---|---|
| 1,809,427 | Spohn | June 9, 1931 |
| 2,535,730 | Gadret | Dec. 26, 1950 |

OTHER REFERENCES

Bauer: "Canadian Journal of Technology," vol. 32, May 1954, pages 91–101.

Sillen: Svensk Papperstidning," vol. 55, NR 16½, Sept. 4, 1952, pages 622–631.